United States Patent [19]

Fermigier et al.

[11] Patent Number: 4,830,793
[45] Date of Patent: May 16, 1989

[54] METHOD OF INJECTING POLYURETHANE FOAM INTO A HOLLOW ENVELOPE, MORE PARTICULARLY A VEHICLE HEAD-REST

[75] Inventors: Claude Fermigier; Luc Fermigier, both of Paris, France

[73] Assignee: Establissements Treves - Societe Anonyme Francaise, Paris, France

[21] Appl. No.: 75,834

[22] Filed: Jul. 17, 1984

[30] Foreign Application Priority Data

Jul. 18, 1986 [FR] France .................... 86 10456

[51] Int. Cl.⁴ ................. B29C 39/02; B29C 45/03
[52] U.S. Cl. ...................... 264/39; 264/45.2; 264/259; 264/313; 264/DIG. 83; 425/4 R; 425/110; 425/200; 425/225
[58] Field of Search .............. 425/110, 4 R, 817 R, 425/200, 225; 264/39, 45.2, DIG. 83, 313, 259

[56] References Cited

U.S. PATENT DOCUMENTS

| | | | |
|---|---|---|---|
| 329,712 | 11/1885 | Cailleaux | 141/258 |
| 2,236,727 | 4/1941 | Dewees | 222/386 |
| 2,314,639 | 3/1943 | West et al. | 141/317 |
| 2,569,928 | 10/1951 | Gonzalez | 141/258 |
| 3,140,735 | 7/1964 | Windle | 141/258 |
| 3,273,760 | 9/1966 | Frankenberg | 222/386 |
| 3,424,827 | 1/1969 | Galiza et al. | 425/4 R |
| 3,452,390 | 7/1969 | Borcovec | 425/4 R |
| 3,799,199 | 3/1974 | Rumpff | 425/817 R |
| 3,896,202 | 7/1975 | Palaiu | 264/45.2 |
| 4,030,643 | 6/1977 | Van Manen | 222/386 |
| 4,141,470 | 2/1979 | Schulte et al. | 425/817 R |
| 4,266,928 | 5/1981 | Weidner et al. | 425/4 R |
| 4,268,557 | 5/1981 | Bracesco | 425/817 R |

FOREIGN PATENT DOCUMENTS

| | | |
|---|---|---|
| 61972 | 6/1982 | European Pat. Off. . |
| 94375 | 11/1983 | European Pat. Off. . |
| 2406041 | 1/1960 | Fed. Rep. of Germany . |
| 2815460 | 10/1979 | Fed. Rep. of Germany ..... 425/4 R |
| 342749 | 1/1960 | Switzerland . |
| 1329632 | 9/1973 | United Kingdom ............ 425/817 R |
| 1428968 | 3/1976 | United Kingdom ............ 425/817 R |

Primary Examiner—Willard Hoag
Attorney, Agent, or Firm—Lowe, Price, LeBlanc, Becker & Shur

[57] ABSTRACT

The invention provides a method and apparatus for the high pressure injection of polyurethane foam into a hollow envelope using means of the type including a chamber for mixing the constituents of the polyurethane foam, a cylinder communicating with said chamber and open at both its ends, one of its ends opening into the orifice of the hollow envelope and the other end serving as inlet for a piston adapted for sliding in said cylinder and driving the polyurethane foam therefrom into said envelope, wherein said envelope is substantially vertical, its upper end opens into the orifice of the hollow envelope and is of a volume close to half that defined by the envelope and the movement of the piston in said cylinder is adjustable in synchronism with the cycle of the mixing head.

6 Claims, 1 Drawing Sheet

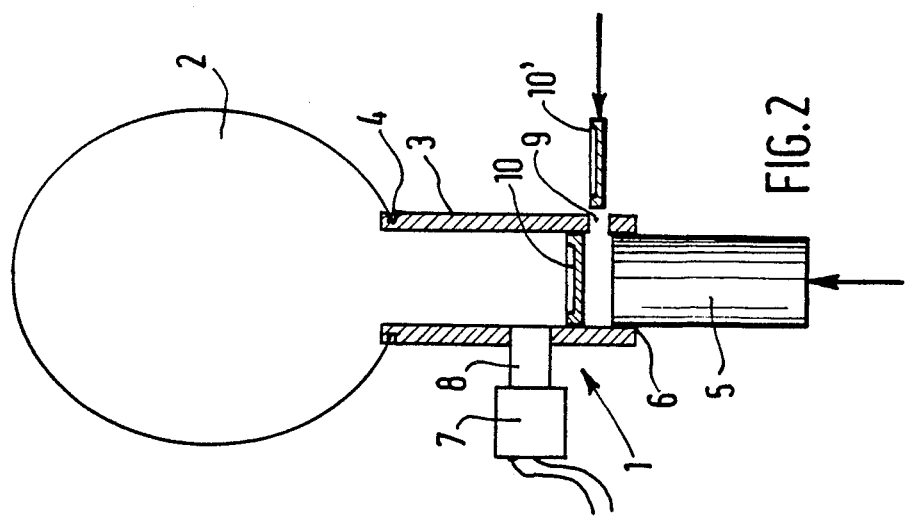
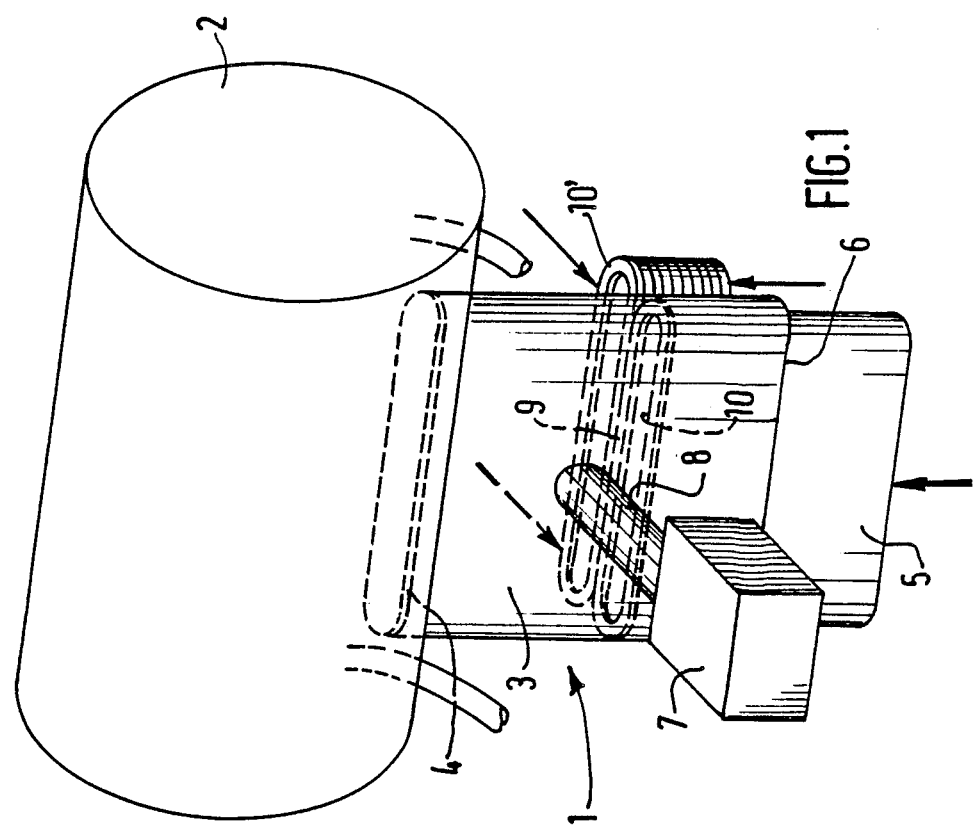

METHOD OF INJECTING POLYURETHANE FOAM INTO A HOLLOW ENVELOPE, MORE PARTICULARLY A VEHICLE HEAD-REST

BACKGROUND OF THE INVENTION

1. Field of the Invention

The present invention relates to improvements to methods for injecting polyurethane foam under high pressure into a hollow envelope through an orifice provided in said envelope.

Polyurethane foam casting heads are known for putting these methods into practice. The operation of these heads generally includes two phases. The first phase is a mixing phase, during which at least two constituents of the polyurethane foam, a polyol and an isocyanate, are brought under high pressure into a mixing chamber, then this mixture flows through a bore towards an outlet, possibly coinciding with the orifice of an envelope to be filled. The second phase is a recycling and cleaning phase during which at least one piston acts for looping on itself each of the two circuits for feeding the components and for scraping the walls of the bore of the mixing chamber, so as to clean it.

2. Description of the Prior Art

In FR No. 81 06162 a method is also described for injecting polyurethane foam of the above defined type, which uses an injection head further having means for bringing under said piston, before the discharge step, a member for scraping the walls of the bore when the piston slides towards the output of the bore, this scraping member being formed by a plate whose dimensions are substantially equal to the dimensions of the section of the bore and of the orifice and comprising one or more flexible lips extending continuously over its perimeter.

In this method the polyurethane foam is cast in the liquid phase in the hollow envelope inside which the expansion or foaming takes place in situ, the envelope being shaped by an external mold.

To provide the best possible sealing, the wall of the envelope must comprise not only an ordinary fabric but in addition a barrier which may be a distinct foam and manufacture of the envelope is expensive and fairly delicate.

The present invention aims at simplifying such manufacture by avoiding the necessity of providing the hollow envelope with special sealing means, or al least by simplifying the characteristics thereof.

SUMMARY OF THE INVENTION

For this, the invention provides for injecting into the envelope not a liquid foam mixture but a foam mixture in expansion phase, that is to say creamy, in the beaten foam state and leaving this foam to finish its expansion in the envelope. Since this foam has no tendency to wet the wall of the envelope, no sealing means is required, or at least it may be very scant.

For putting this method into practice, the invention provides for the introduction of polyurethane into the envelope through a cylinder of a volume close to half that of the envelope, into which the injection head opens and through which travels a piston whose movement is synchronized with the cycle of the mixing head so that the polyurethane foam undergoes the desired pre-expansion before being driven into the envelope, held inside a shaping mold.

BRIEF DESCRIPTION OF THE DRAWINGS

One embodiment of the invention will now be described by way of non limitative example, with reference to the accompanying drawings in which:

FIG. 1 is a schematical perspective view of the injection head and of the envelope to be filled, and FIG. 2 is a cross sectional view of the assembly of FIG. 1.

DESCRIPTION OF THE PREFERRED EMBODIMENT

The assembly shown in FIG. 1 includes an injection block, shown generally by the reference 1, and a hollow envelope intended to be filled with expanded polyurethane, shown generally by the reference 2 and which may be intended to form a head-rest padding or any other piece of cushioning.

The injection block 1 includes a vertical injection cylinder 3 whose upper orifice 4 is engaged in an opening of corresponding shape formed in the bottom of envelope 2. Block 1 also includes a piston 5 driven by hydraulic, electromechanical or mechanical means (not shown) for sliding in cylinder 3 between the top point, adjacent orifice 4, and a low point, the lower orifice 6 of this cylinder 3. Block 1 further includes a mixing head 7 of conventional structure feeding the mixture into cylinder 3 through the duct 8.

The injection cylinder 3 is pierced at its lower part with an aperture 9 situated a little above the low point of piston 5. This slit 9 allows the introduction of a sealing cylinder 10 of a form corresponding to the inner section of cylinder 3 and intended to provide scraping of the inner walls of this cylinder.

The method of the invention is carried out in the following way.

As is known, the method takes place in two phases. The first phase is the casting phase. With the propulsion cylinder 5 in the low position, a scraping piston 10 has been introduced into cylinder 3 through aperture 9 and is then in contact with the upper end face of piston 5, the aperture being closed.

The two components of the mixture, polyol and isocyanate, are fed under high pressure into the mixing chamber 7 and, under the effect of this pressure, the mixing is effected, it flows through the duct into cylinder 3 closed at its base by the scraping cylinder 10. After a very short time, a few seconds, the propulsion piston 5 drives the scraper piston 10 upwards which drives, towards the orifice 4 of enclosure 2, the mixture which has undergone pre-expansion and is then in the beaten foam state, that is to say very little liquid. The piston 5 continues its upward movement in cylinder 3 and causes this foam to penetrate into envelope 2 where it continues and finishes its expansion. The scraper piston 10 may of course remain in position in orifice 4 to serve as closure means, having a function of finishing the piece.

Of course, the above described embodiments and modes of implementation are not restrictive and any injection method with two operating phases having a closure step following a scraping step, by means of an auxiliary element, is still within the scope of the invention. In particular, the sections of the bore, of the piston and of the plate are not critical but are substantially identical.

We claim:

1. A method for filling an envelope of predetermined form with a quantity of expandable multicomponent foam material, comprising the steps of:
   mixing a plurality of components to generate a supply of the expandable foam material;
   affixing the envelope to a first open end of a cylinder having two open ends;
   inserting a scraping element into said cylinder through an aperture in a cylinder side-wall, locating said scraping element inside the cylinder ahead of a piston that is then movable from a second end of the cylinder toward the first end so as to push the scraping element with an outside edge thereof generally scraping the inside surface of the cylinder;
   delivering under pressure from said supply into said cylinder ahead of the scraping element, said quantity of expandable foam material; and
   moving said piston to push said scraping element in such a manner that said expandable foam material undergoes pre-expansion in said cylinder and thereby moving said quantity of partially expanded foam material through said first end of the cylinder into said envelope.

2. The method of claim 1, wherein said expandable foam material is delivered and moved within the cylinder such that said pre-expansion of foam material in said cylinder allows it to enter the envelope in a creamy, beaten foam state.

3. Apparatus for filling an envelope of predetermined form with a quantity of expandable multicomponent foam material, comprising:
   mixing head means for mixing a plurality of components to generate a supply of expandable foam material;
   cylinder means having at least two open ends spaced from each other and means for releasably attaching the envelope to one of said open ends such that an interior region of the envelope communicates with an interior region of the cylinder means, said mixing head means connected to supply said expandable foam material into the interior region of the cylinder means;
   piston means within the cylinder means and movable from the other end of the cylinder means towards the first end thereof to push the expandable foam material from the mixing head means into the envelope; and
   means for controlling the delivery of said expandable foam material into the envelope by controlling movement of said piston to allow for pre-expansion of the foam material within the cylinder means before it is pushed by the piston means into the envelope said cylinder having an aperture in a side-wall thereof for inserting a free-piston into the cylinder.

4. The apparatus of claim 3, wherein said free piston is disposed between said piston means and said envelope and movable by said piston means to scrap said material from the wall of said cylinder.

5. The apparatus of claim 3, wherein said cylinder has a volume that, prior to injection of expandable foam into said cylinder, is close to half the volume of said envelope.

6. The apparatus of claim 3, wherein said means for controlling being operable so that said expandable foam material is delivered and moved within the cylinder such that said pre-expansion of foam material in said cylinder allows it to enter the envelope in a creamy, beaten foam state.

* * * * *